United States Patent
Ahmed et al.

(10) Patent No.: US 8,131,301 B1
(45) Date of Patent: Mar. 6, 2012

(54) GEOGRAPHIC RELOCATION PROCESSING OF WIRELESS COMMUNICATION EQUIPMENT

(75) Inventors: Syed U. Ahmed, Overland Park, KS (US); Feng Xie, Leawood, KS (US); Abhishek Lall, Lawrence, KS (US); Jorge T. Climaco, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 312 days.

(21) Appl. No.: 12/582,479

(22) Filed: Oct. 20, 2009

(51) Int. Cl.
*H04W 40/00* (2009.01)

(52) U.S. Cl. .................. 455/446; 455/453; 370/254

(58) Field of Classification Search .......... 455/450–453, 455/446, 437; 370/254
See application file for complete search history.

(56) References Cited

U.S. PATENT DOCUMENTS

| | | | | |
|---|---|---|---|---|
| 5,561,841 A * | 10/1996 | Markus | ........................ | 455/446 |
| 6,336,035 B1 * | 1/2002 | Somoza et al. | ............... | 455/446 |
| 6,842,726 B1 * | 1/2005 | Scharosch et al. | .............. | 703/13 |
| 7,313,391 B2 * | 12/2007 | Gutowski | ....................... | 455/423 |
| 7,630,327 B2 * | 12/2009 | Arpee | ............................ | 370/254 |
| 2003/0190917 A1 * | 10/2003 | De Cambray-Mathan | ... | 455/446 |
| 2006/0146707 A1 * | 7/2006 | Brethereau et al. | ........... | 370/230 |
| 2007/0117565 A1 * | 5/2007 | Lidbrink | ....................... | 455/446 |
| 2007/0165541 A1 * | 7/2007 | Arpee | .......................... | 370/254 |
| 2008/0096566 A1 * | 4/2008 | Brunner et al. | ................ | 455/437 |
| 2009/0125356 A1 * | 5/2009 | Allen | .............................. | 705/7 |
| 2011/0007645 A1 * | 1/2011 | Tompson et al. | ............. | 370/252 |

* cited by examiner

*Primary Examiner* — Jean A Gelin
*Assistant Examiner* — Nathan Taylor

(57) ABSTRACT

What is disclosed is a method of operating a processing system to relocate wireless communication equipment. The method includes receiving customer data and performance data for wireless communication equipment located at a plurality of potential donor sites, and receiving geographic information for a target relocation site. The method also includes processing the customer data, the performance data, and the geographic information to determine a relocation score for each of the wireless communication equipment located at the plurality of potential donor sites, and selecting wireless communication equipment of at least one of the plurality of potential donor sites for relocation to the target relocation site based upon the relocation score.

16 Claims, 5 Drawing Sheets

GEOGRAPHIC RELOCATION PROCESSING OF WIRELESS COMMUNICATION EQUIPMENT

TECHNICAL FIELD

Aspects of the disclosure are related to the field of communications, and in particular, managing wireless communication equipment in wireless communication networks.

TECHNICAL BACKGROUND

Wireless communication networks of wireless communication providers typically include regional and national networks comprising numerous wireless coverage areas and sites where wireless communication equipment is located. These wireless coverage sites can include multiple pieces of equipment, such as transceivers and antennas, for providing communication service to wireless communication devices located in their associated wireless coverage areas. In many examples, the wireless communication equipment is referred to as base transceiver station (BTS) equipment. A BTS can include multiple pieces of communication equipment which can serve a portion of a wireless coverage area, referred to as a sector, or can serve a particular carrier frequency or communication channel of a sector or wireless coverage area. Thus, many pieces of individual communication equipment can be located at a wireless coverage site to provide communication service to wireless communication devices across many sectors and communication carriers.

However, after initial wireless network planning and equipment installation, many wireless communication sites lack adequate wireless communication equipment to provide coverage or service to their associated wireless coverage areas. It can be costly and inefficient to procure and deploy new wireless communication equipment to supplement over-utilized wireless communication equipment, or to expand coverage to new geographic areas.

Overview

What is disclosed is a method of operating a processing system to relocate wireless communication equipment. The method includes receiving customer data and performance data for wireless communication equipment located at a plurality of potential donor sites, and receiving geographic information for a target relocation site. The method also includes processing the customer data, the performance data, and the geographic information to determine a relocation score for each of the wireless communication equipment located at the plurality of potential donor sites, and selecting wireless communication equipment of at least one of the plurality of potential donor sites for relocation to the target relocation site based upon the relocation score.

What is also disclosed is a processing system to relocate wireless communication equipment. The processing system includes a communication interface configured to receive customer data and performance data for wireless communication equipment located at a plurality of potential donor sites, and receive geographic information for a target relocation site. The processing system also includes a relocation processor configured to process the customer data, the performance data, and the geographic information to determine a relocation score for each of the wireless communication equipment located at the plurality of potential donor sites, and select wireless communication equipment of at least one of the plurality of potential donor sites for relocation to the target relocation site based upon the relocation score.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
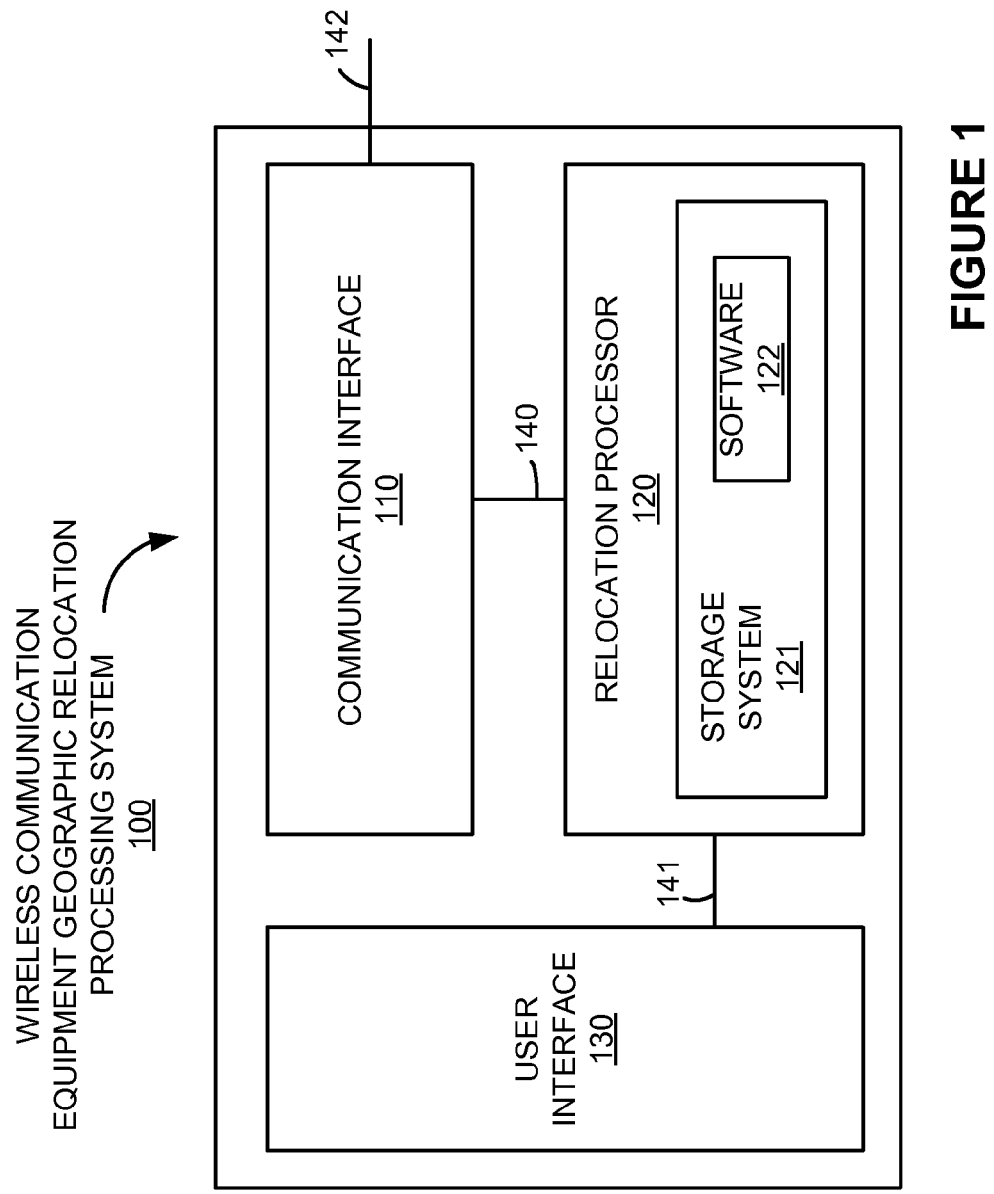
FIG. 1 is a block diagram illustrating a wireless communication equipment geographic relocation processing system.

FIG. 1 is a block diagram illustrating wireless communication equipment geographic relocation processing system 100. Wireless communication equipment geographic relocation processing system 100 includes communication interface 110, relocation processor 120, and user interface 130. Communication interface 110 and relocation processor 120 communicate over link 140. User interface 130 and relocation processor 120 communicate over link 141. Communication interface 110 communicates with external systems, omitted for clarity, over link 142. Wireless communication equipment geographic relocation processing system 100 may be distributed among multiple devices that together form elements 110, 120-122, 130, and 140-142.

Communication interface 110 comprises a data interface for exchanging data with external systems over link 142 to receive customer data, performance data, and geographic information, as well as other information and data. In this example, communication interface 110 can also exchange instructions and information over link 140 with relocation processor 120. Relocation processor 120 includes storage system 121. Relocation processor 120 retrieves and executes software 122 from storage system 121. When executed by relocation processor 120, software 122 directs wireless communication equipment geographic relocation processing system 100 to operate as described herein. In further examples, relocation processor 120 can also receive instructions and information from user interface 130, as well as communicate information regarding the execution and results of software 122 to a user of wireless communication equipment geographic relocation processing system 100 via user interface 130.

Figure 2:
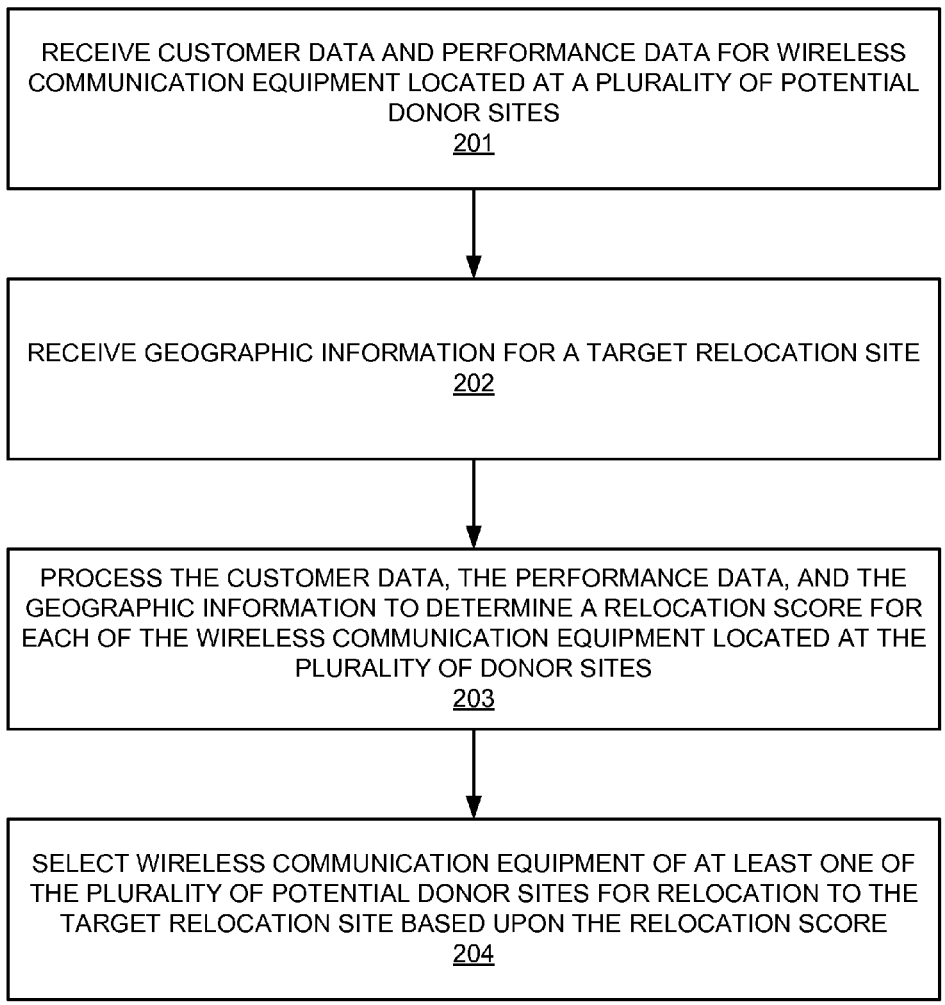
FIG. 2 is a flow diagram illustrating a method of operation of a wireless communication equipment geographic relocation processing system.

FIG. 2 is a flow diagram illustrating a method of operation of wireless communication equipment geographic relocation processing system 100 to relocate wireless communication equipment from a donor site to a target site. The operations of FIG. 2 are referenced herein parenthetically. In FIG. 2, communication interface 110 of wireless communication equipment geographic relocation processing system 100 receives (201) customer data and performance data for wireless communication equipment located at a plurality of potential donor sites. The customer data could include information related to the number of customers, a quality rating of the customers, or other customer information for each of the plurality of potential donor sites. The performance data could include traffic loading information, communications quality information, or other performance information for each of the plurality of potential donor sites. Communication interface 110 also receives (202) geographic information for a target relocation site. This geographic information could include a geographic location of the target relocation site as well as for the plurality of potential donor sites, among other information. Relocation processor of wireless communication equipment geographic relocation processing system 100 processes (203) the customer data, the performance data, and the geographic information to determine a relocation score for each of the wireless communication equipment located at plurality of potential donor sites. Relocation processor 120 then selects (204) wireless communication equipment of at least one of the plurality of potential donor sites for relocation to the target relocation site based upon the relocation score.

Figure 3:
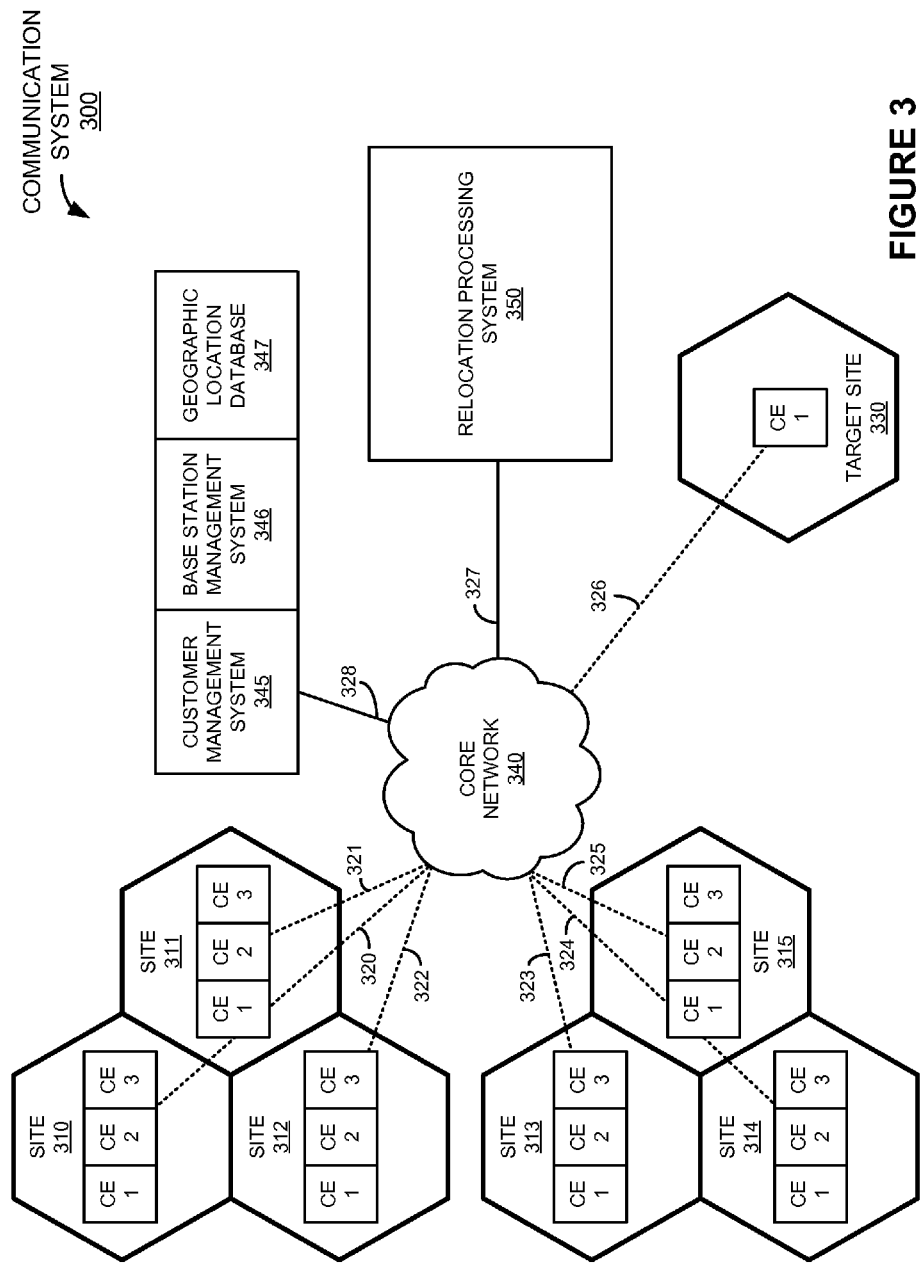
FIG. 3 is a system diagram illustrating a communication system.

FIG. 3 is a system diagram illustrating communication system 300. Communication system 300 includes relocation processing system 350 as an example of wireless communication equipment geographic relocation processing system 100 of FIG. 1, although wireless communication equipment geographic relocation processing system 100 could use other configurations. Communication system 300 also includes potential donor sites 310-315, target relocation site 330, core network 340, customer management system 345, base station management system 346, and geographic location database 347. Core network 340 and potential donor sites 310-315 individually communicate over links 321-325. In this example, links 321-325 are T1 links used as backhaul links between the wireless communication equipment (CE) of each potential donor site and core network 340. Core network 340 and target site 330 also communicate over link 326, which in this example is a T1 backhaul link as discussed for links 321-325. Core network 340 and customer management system 345, base station management system 346, and geographic location database 347 communicate over link 328. Link 328 is an Ethernet link carrying IP packets in this example. Core network 340 and relocation processing system 350 communicate over link 327. Link 327 is an Ethernet link carrying IP packets in this example, although other configurations could be employed, such as discussed for link 142 in FIG. 1. Although links 321-328 are each shown as a single link in FIG. 3, it should be understood that in other examples, multiple or separate links could be employed.

Core network 340 is a core network of a wireless communications provider in this example. Core network 340 could include further sites, base stations, routers, gateways, controller systems, processing systems, carrier equipment, or other communication equipment. Each site 310-315 includes three pieces of wireless communication carrier equipment in this example. Target site 330 includes one piece of wireless communication carrier equipment in this example. The wireless communication carrier equipment are shown as carrier equipment (CE) 1-3 for each site 310-315, and as CE 1 for target site 330.

Each CE of sites 310-315 and 330 comprises RF communication and control circuitry, and include wireless access node equipment capable of communicating with and providing communication service over wireless links to wireless communication devices located within the associated site. Each CE could also comprise a piece of removable equipment, circuit board, antenna, or other communication and processing equipment. Each CE of sites 310-315 and 330 communicates with wireless communication devices within an associated wireless coverage area using the Evolution-Data Optimized (EV-DO) protocol in this example, although in other examples different wireless protocols could be employed, such as Code Division Multiple Access (CDMA), Worldwide Interoperability for Microwave Access (WIMAX), Global System for Mobile Communication (GSM), Universal Mobile Telecommunications System (UMTS), Long Term Evolution (LTE), Wireless Fidelity (WIFI), High Speed Packet Access (HSPA), or some other wireless communication format, including combinations, improvements, or variations thereof. Wireless communication devices could be located within sites 310-315 and 330, but are not shown in FIG. 3 for clarity.

Each CE of sites 310-315 and 330 also represents wireless communication equipment for handling a single carrier or channel of a wireless link. A carrier represents a portion of the total wireless communications of a wireless link as transferred over a single carrier frequency or channel portion. In some examples, a wireless communication device can only communicate with CE over a single carrier or channel. For example, in the EV-DO protocol, a carrier can include single a 1.25 MHz channel assigned to a single wireless communication device or single wireless communication session. Examples of EV-DO using a single channel are typically referred to as EV-DO revision A (EV-DO rev. A). When multiple channels are available, such as when CE 1-3 are used in sites 310-315, three channels can be used to simultaneously communicate with a single wireless communication device. In the EV-DO example cited above, three channels could include using three simultaneous 1.25 MHz channels—one channel per channel equipment—for a single wireless communication device. Examples of EV-DO using more than one channel are typically referred to as EV-DO revision B (EV-DO rev. B). In many examples, using multiple carriers or channels can increase the bandwidth, throughput, or data rate experienced by a wireless communication device communicating in a particular site, and also can reduce latency of wireless communications. However, using multiple carriers or channels for each wireless communication device can many times increase the quantity of carrier equipment located at each site.

Also as shown in FIG. 3, each site 310-315 and 330 has a limited geographic range over which it can provide communication services to wireless communication devices. The limited range is indicated by the hexagonal-shaped wireless coverage areas in FIG. 3. Although a hexagonal region defining the coverage area is shown in FIG. 3, it should be understood that the coverage area could be of other shapes and configurations, as determined by geographic features, empirical data, radio frequency (RF) conditions, the associated CE, or by other factors, including combinations thereof. Also, each coverage area of sites 310-315 and 330 could each be further divided into sectors. A sector can represent a particular slice of a geographic coverage area, typically served by a single antenna, antenna array, or carrier equipment. Site 310-315 and 330 could each incorporate base transceiver station (BTS) equipment for providing communication service to the associated site. A BTS could include communication equipment for a site, such as channel equipment, carrier equipment, antennas, power sources, tower structures, among other equipment. Further carrier equipment or base transceiver station equipment could be included in sites 310-315 and 330 in examples where sectors are employed. For example, a site with three sectors and three carriers per sector could include nine CE, one for each carrier.

Customer management system 345 includes systems and equipment for determining and maintaining information about customers using wireless communication devices in communication system 300, such as generating and tracking accounting and billing information of wireless communication devices, accumulating various communication network statistics and parameters related to wireless communication devices, such as registration information, usage detail records (UDR), user profiles, quality-of-service profiles, customer churn, customer credit status, or other information. In some examples, customer management system 345 includes authentication, authorization, and accounting (AAA) systems, enhanced accounting mediation system (EAMS), or other systems. Base station management system 346 includes systems and equipment for determining and maintaining performance information about BTS equipment and carrier equipment of communication system 300, such as traffic loading, blocked calls, dropped calls, erlangs, capacity, or other performance information. In some examples, base station management system 346 includes base station controllers, mobile switching centers, or other systems. Geographic location database 347 includes database systems and equipment for determining or storing geographic locations of CEs of communication system 300, such as geographic coordinates, relative distances between CEs, elevations, or other information. In typical examples, customer management system 345, base station management system 346, and geographic location database 347 each incorporate computer microprocessors, circuitry, or some other processing devices or software system, and may be distributed among multiple processing devices. Customer management system 345, base station management system 346, and geographic location database 347 could each include an application server or database system, and may also include software such as an operating system, logs, utilities, drivers, databases, and other software stored on a computer-readable medium. In many examples, customer management system 345, base station management system 346, and geographic location database 347 are each is operated by the same communications service provider as core network 340 and sites 310-315 and 330. In further examples, customer management system 345, base station management system 346, and geographic location database 347 are located in the same equipment or systems as each other.

Figure 4:
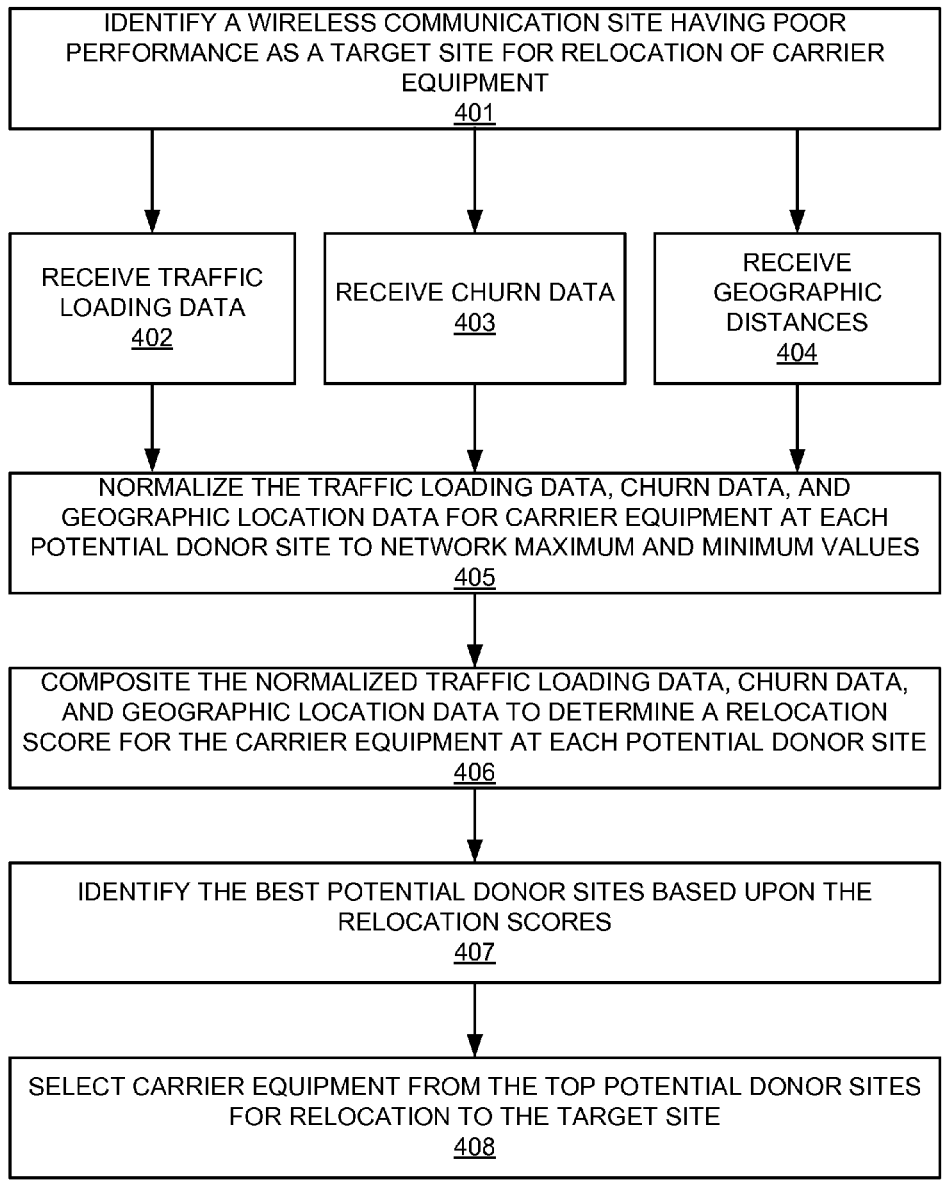
FIG. 4 is a flow diagram illustrating a method of operation of a communication system.

FIG. 4 is a flow diagram illustrating a method of operation of communication system 300 to relocate wireless communication carrier equipment (CE) from at least one of potential donor sites 310-315 to target site 330. The operations of FIG. 4 are referenced herein parenthetically. In FIG. 4, relocation processing system 350 identifies (401) a wireless communication site having poor performance or poor service quality as a target site for relation of CE equipment. In this example, target site 330 is determined to have poor service quality due to having only one CE located therein. For instance, target site 330 may have experienced an increase in traffic loading over time, or perhaps an increase in physical obstacles has reduced service quality—such as a new office building blocking signal coverage for a portion of site 330.

Relocation processing system 350 then requests and receives traffic loading data (402) and churn data (403) of potential donor sites 310-315, as well as geographic distances (404) between potential donor sites 310-315 and target site 330. In this example, traffic loading data is received from base station management system 346, churn data is received from customer management system 345, and geographic distances are received from geographic location database 347. In addition to the traffic loading data, churn data, and geographic distances for each CE of potential donor sites 310-315, relocation processing system 350 could also receive maximums or minimums of each factor for the entire wireless communication network represented in communication system 300. In further examples, a different number of sites could be considered than shown in FIG. 3, as the number of sites of communication system 300 could vary depending upon the size and configuration of the wireless communication network.

The traffic loading data received from base station management system 346 relates to a level of usage of carrier equipment, such as erlangs, dropped calls, and blocked calls. Erlangs can relate to a usage level of the wireless communication resources of carrier equipment, which can indicate how heavily utilized carrier equipment is, or how much capacity carrier equipment has, such as channels, carriers, or pro rata indicators of capacity. In some examples, the traffic loading data for the donor sites is collected over a period of time, such as a month. In other examples, only the highest days of usage of a period of time are considered, or a moving average over a period of days is considered in determining the traffic loading levels of carrier equipment. Dropped calls and blocked calls can also relate to a loading level of carrier equipment. For example, if many blocked calls are experienced by a CE, it could indicate that few resources are available for new calls, whereas if few blocked calls are experienced, a lower traffic level may exist as calls are rarely blocked.

The churn data received from customer management system 345 relates to a quantity of customers homed at a BTS that subsequently discontinue service with the service provider of the BTS. In typical examples, a single BTS will be considered a "home" BTS for a customer using a wireless communication device, many times determined upon initial sign-up by a customer for wireless communication service, or by other factors. If many of these homed customers discontinue service with the wireless service provider operating the BTS, then it could indicate a high churn level. A high churn level may relate to a BTS which has less of a priority in remaining in its present location, as many customers discontinue service at that location, indicating an area or site of disloyal customers. For example, a churn factor would be increased if a Sprint customer homed at a particular BTS switches to another wireless carrier company. Other customer data factors that can be considered include a quantity of customers homed at each BTS with a threshold level of positive credit history. The positive credit history can indicate loyal and good customers at a particular location or site, and indicate a BTS which should not be relocated as the homed customers may subsequently experience a degraded service level. Credit history could be determined by payment history for communication services, consumer credit ratings, or other sources, and be used to categorize customers with prime credit and sub-prime credit. In other examples, customers that pay for a higher level of service could receive a prime credit rating. The churn data or customer data discussed above could relate to a particular CE of a BTS.

Geographic distances received from geographic location database 347 relate the geographic location of each potential donor CE to the geographic location of target site 330. The geographic distances could be considered in a physical distance between each CE of potential donor sites 310-315 and target site 330, geographic coordinates, or in relocation costs associated with relocating a CE from a potential donor site to target relocation site 330.

Relocation processing system 350 normalizes (405) the traffic loading data, churn data, and geographic distances to network maximum and minimum values. This normalization is done in this example to allow for efficient comparison and compositing of each factor with each other. In one example of normalization, a received value for a particular factor of a CE is subtracted from a maximum value for that particular factor, and the resulting value is then divided by a minimum value subtracted from the maximum value. The above formula using churn as an example can be shown as: (churn maximum−churn for a CE)/(churn maximum−churn minimum). The result of the formula would be a normalized value for the churn of the particular CE. The maximums and minimums could be considered across the entire communication system, or across a portion or region of the communication system. The above formula could be used to normalize values of other factors, such as traffic loading and distances. In the example of distances, geographic coordinates, such as latitude and longitude, could be processed to determine a physical distance across the surface of the Earth. Various methods exist for converting a pair of geographic coordinates to a distance, although one example includes: 1.150779*60*(180/pi)*arc-cosine(sin(arctangent(1)/45*latitude of CE)*sin(arctangent(1)/45*latitude of target site)+cosine(arctangent(1)/45*latitude of CE)*cosine(arctangent(1)/45*latitude of target site)*cosine(arctangent(1)/45*longitude of target site−arctangent(1)/45*longitude of CE)).

Relocation processing system 350 then composites (406) the normalized traffic loading data, churn data, and geographic location data to determine a relocation score for the CEs of potential donor sites 310-315. In some examples, the compositing includes adding together the normalized factors. In other examples, a scaling factor could be applied to each factor prior as part of the compositing process. The relocation score allows for comparison between each CE across potential donor sites 310-315 to determine a suitable CE for relocation to target site 330. Once the relocation scores have been determined, relocation processing system 350 identifies (407) the best or top potential donor sites based upon the relocation scores. In some examples, a list is generated which includes the top potential donor sites with relocation scores that indicate relocation is favorable. Relocation processing system 350 then selects (408) a CE from the top potential donor sites from among sites 310-315 for relocation to target site 330. In some examples, a single CE is identified for relocation, while in other examples, multiple CEs are selected. In the example where multiple CEs are selected, the CE equipment could be selected across different donor sites.

Figure 5:
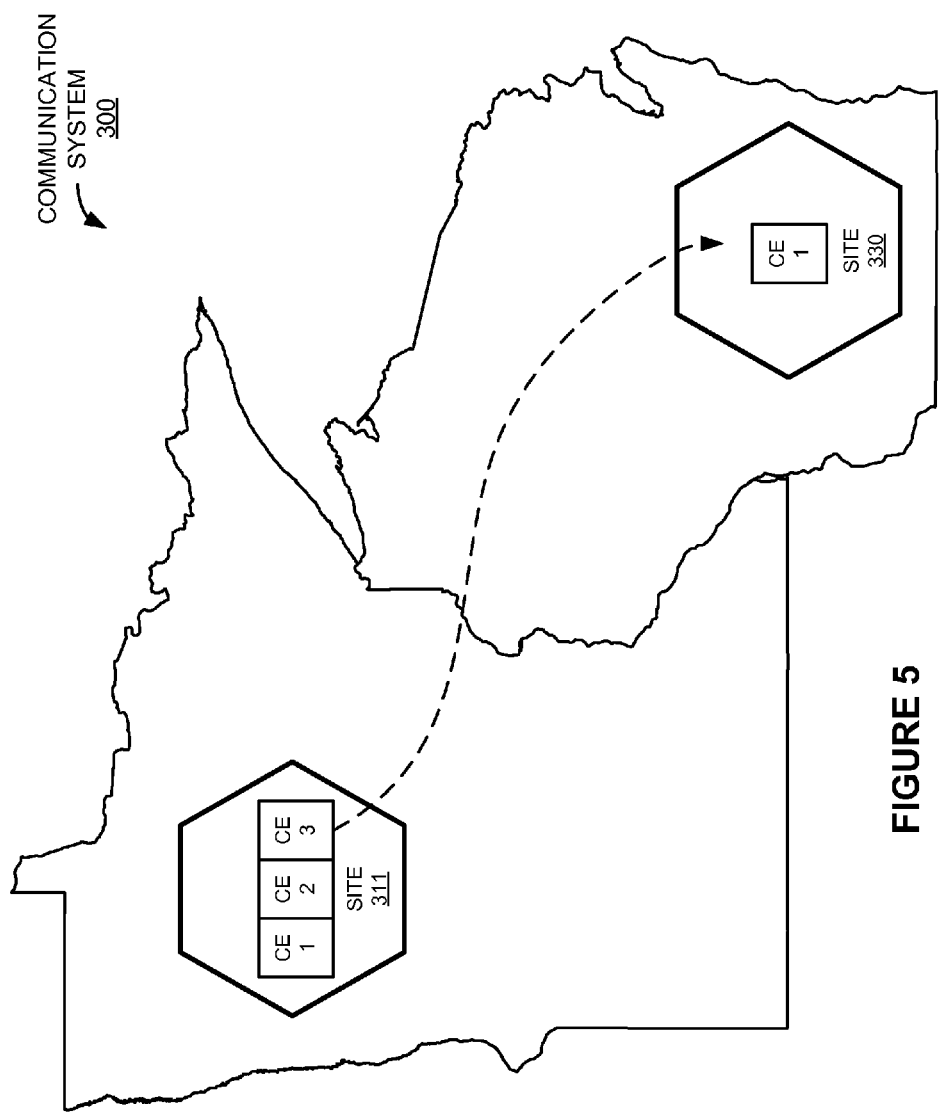
FIG. 5 is a diagram illustrating an example geographic relocation.

FIG. 5 is a diagram illustrating an example geographic relocation in communication system 300 as described above in FIG. 4. In the example shown in FIG. 5, CE 3 from site 311 is selected by relocation processing system 350, according to the process described above, for relocation to site 330. After relocation, site 330 will have two CEs located therein. As shown in FIG. 5, CE equipment from site 311 in Minnesota is relocated to site 330 in Wisconsin.

Advantageously, a process as described above can be used to identify underutilized wireless communication equipment located across many potential donor sites of a wireless communication network or wireless communication system. In many examples, the wireless communication network is a regional or national wireless communication network and comprises many wireless communication sites and pieces of wireless communication equipment. Underutilized equipment can be relocated to sites identified as having overutilized wireless communication equipment. In other examples, equipment located at various wireless communication sites can be redistributed to better utilize physical capital and resources of a wireless carrier company. Additionally, sites expected to experience an increase in traffic loading, customer usage, or other factors can be identified and have additional equipment relocated thereto. Many factors can be considered when determining the relocation score as described herein, for example, traffic loading, geographic considerations, relocation costs, as well as customer usage patterns and credit ratings.

Referring back to FIG. 1, communication interface 110 comprises a data interface for exchanging data with external systems over link 142 to receive customer data, performance data, and geographic information, as well as other information and data. In this example, communication interface 110 can also exchange instructions and information over link 140 with relocation processor 120. In some examples, communication interface 110 incorporates equipment for communicating over a wired or wireless interface of links 140 and 142 using various protocols and interfaces, such as Ethernet, serial communication, T1, Internet protocol (IP), wireless-fidelity (WiFi), optical networking, asynchronous transfer mode (ATM), hybrid fiber coax (HFC), or other communication protocols and interfaces. In further examples, communication interface 110 includes a wireless communication device such as a wireless phone.

Relocation processor 120 includes storage system 121. Relocation processor 120 retrieves and executes software 122 from storage system 121. Relocation processor 120 could incorporate a computer microprocessor, logic circuit, or some other processing device, and may be distributed among multiple processing devices. In some examples, relocation processor 120 or user interface 130 are located within the same equipment in which communication interface 110 is located. Storage system 121 could include a computer-readable medium such as a disk, tape, integrated circuit, server, or some other memory device, and also may be distributed among multiple memory devices. Software 122 may include an operating system, logs, utilities, drivers, networking software, and other software typically loaded onto a computer system. Software 122 could contain an application program, firmware, or some other form of computer-readable processing instructions. When executed by relocation processor 120, software 122 directs wireless communication equipment geographic relocation processing system 100 to operate as described herein.

User interface 130 includes equipment and circuitry for receiving user input and control. Examples of user interface 130 include push buttons, touchscreens, selection knobs, dials, switches, actuators, keys, keyboards, pointer devices, microphones, transducers, potentiometers, non-contact sensing circuitry, or other human-interface equipment. In some examples, user interface 130 also includes equipment to communicate information to a user of wireless communication equipment geographic relocation processing system 100. Examples of the equipment to communicate information to the user could include indicator lights, lamps, light-emitting diodes, displays, haptic feedback devices, audible signal transducers, speakers, buzzers, alarms, or other indicator equipment, including combinations thereof. In further examples, user interface 130 includes a network interface for exchanging messaging with a user of wireless communication equipment geographic relocation processing system 100 over email, text messaging, data files, or other messaging.

Links 140-142 each comprises a physical, logical, or virtual communication link, capable of communicating data, control signals, and communications, along with other information. In some examples, links 140-142 are each encapsulated within the elements of communication interface 110, relocation processor 120, or user interface 130, and may each be a software or logical link. In other examples, links 140-142 each use various communication media, such as air, space, metal, optical fiber, or some other signal propagation path, including combinations thereof. Links 140-142 could be wired or wireless and use various communication protocols such as Internet, Internet protocol (IP), local-area network (LAN), optical networking, hybrid fiber coax (HFC), telephony, T1, ATM, or some other communication format, including combinations or variations thereof. Links 140-142 could be direct links or might include various equipment, intermediate components, systems, and networks.

FIGS. 1-5 and the previous descriptions depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A method of operating a processing system to relocate wireless communication equipment, the method comprising:
   receiving customer data and performance data for wireless communication equipment located at a plurality of potential donor sites;
   receiving geographic information for a target relocation site;
   processing the customer data, the performance data, and the geographic information to determine a relocation score for each of the wireless communication equipment located at the plurality of potential donor sites;
   selecting wireless communication equipment of at least one of the plurality of potential donor sites for relocation to the target relocation site based upon the relocation score;
   wherein selecting wireless communication equipment of the one of the plurality of potential donor sites for relocation to the target relocation site based upon the relocation score comprises:
   determining underutilized wireless communication equipment across the plurality of potential donor sites based upon the relocation score; and
   selecting the most underutilized wireless communication equipment of the plurality of potential donor sites for relocation to the target relocation site;
   wherein the wireless communication equipment comprises carrier equipment for a sector of a base station.

2. The method of claim 1, wherein processing the customer data, the performance data, and the geographic information to determine the relocation score comprises:
   normalizing the customer data, the performance data, and the geographic information to associated maximum values of the customer data, the performance data, and the geographic information of a wireless communication network comprising the target relocation site and the plurality of potential donor sites; and
   compositing the normalized customer data, performance data, and geographic information to determine the relocation score.

3. The method of claim 1, wherein the customer data comprises churn data, wherein the churn data comprises a quantity of customers homed at each of the plurality of potential donor sites that discontinue service with the service provider of the plurality of potential donor sites.

4. The method of claim 1, wherein the customer data comprises a quantity of customers homed at each of the plurality of potential donor sites with a threshold level of positive credit history.

5. The method of claim 1, wherein the performance data comprises traffic loading of each of the plurality of potential donor sites.

6. The method of claim 1, wherein the performance data comprises data related to blocked calls and dropped calls of each of the plurality of potential donor sites.

7. The method of claim 1, wherein the geographic information comprises relocation costs associated with individually relocating wireless communication equipment of each of the plurality of potential donor sites to the target relocation site.

8. The method of claim 1, wherein the geographic information comprises a geographic distance of the target relocation site from each of the plurality of potential donor sites.

9. A processing system to relocate wireless communication equipment, comprising:
   a communication interface configured to receive customer data and performance data for wireless communication equipment located at a plurality of potential donor sites;
   wherein the wireless communication equipment comprises carrier equipment for a sector of a base station;
   the communication interface configured to receive geographic information for a target relocation site;
   a relocation processor configured to process the customer data, the performance data, and the geographic information to determine a relocation score for each of the wireless communication equipment located at the plurality of potential donor sites; and
   the relocation processor configured to select wireless communication equipment of at least one of the plurality of potential donor sites for relocation to the target relocation site based upon the relocation score;
   the relocation processor configured to determine underutilized wireless communication equipment across the plurality of potential donor sites based upon the relocation score; and
   the relocation processor configured to select the most underutilized wireless communication equipment of the plurality of potential donor sites for relocation to the target relocation site.

10. The processing system of claim 9, comprising:
    the relocation processor configured to normalize the customer data, the performance data, and the geographic information to associated maximum values of the customer data, the performance data, and the geographic information of a wireless communication network comprising the target relocation site and the plurality of potential donor sites; and
    the relocation processor configured to composite the normalized customer data, performance data, and geographic information to determine the relocation score.

11. The processing system of claim 9, wherein the customer data comprises churn data, wherein the churn data comprises a quantity of customers homed at each of the plurality of potential donor sites that discontinue service with the service provider of the plurality of potential donor sites.

12. The processing system of claim 9, wherein the customer data comprises a quantity of customers homed at each of the plurality of potential donor sites with a threshold level of positive credit history.

13. The processing system of claim 9, wherein the performance data comprises traffic loading of each of the plurality of potential donor sites.

14. The processing system of claim 9, wherein the performance data comprises data related to blocked calls and dropped calls of each of the plurality of potential donor sites.

15. The processing system of claim 9, wherein the geographic information comprises relocation costs associated with individually relocating wireless communication equipment of each of the plurality of potential donor sites to the target relocation site.

16. The processing system of claim 9, wherein the geographic information comprises a geographic distance of the target relocation site from each of the plurality of potential donor sites.

* * * * *